(12) United States Patent
Colar et al.

(10) Patent No.: US 9,049,164 B2
(45) Date of Patent: *Jun. 2, 2015

(54) DYNAMIC MESSAGE RETRIEVAL BY SUBDIVIDING A MESSAGE QUEUE INTO SUB-QUEUES

(71) Applicant: International Business Machines Corporation, Armonk, NY (US)

(72) Inventors: Gerald D. Colar, Mableton, GA (US); Melanie R. Diggs, Mableton, GA (US); Terrence E. White, Raleigh, NC (US); Charles K. Young, Powder Springs, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/906,102

(22) Filed: May 30, 2013

(65) Prior Publication Data

US 2013/0254318 A1 Sep. 26, 2013

Related U.S. Application Data

(63) Continuation of application No. 13/425,279, filed on Mar. 20, 2012.

(51) Int. Cl.
*G06F 15/167* (2006.01)
*H04L 12/58* (2006.01)
*H04L 12/863* (2013.01)

(52) U.S. Cl.
CPC .............. *H04L 51/22* (2013.01); *H04L 47/622* (2013.01); *H04L 47/6235* (2013.01)

(58) Field of Classification Search
CPC .......................... H04L 47/622; H04L 47/6235
USPC ................................ 709/213–215; 710/52–57
See application file for complete search history.

(56) References Cited

U.S. PATENT DOCUMENTS

| | | | | |
|---|---|---|---|---|
| 5,230,084 | A * | 7/1993 | Nguyen | 340/7.34 |
| 6,694,388 | B1 * | 2/2004 | Schzukin et al. | 710/52 |
| 7,133,399 | B1 * | 11/2006 | Brewer et al. | 370/360 |
| 7,562,365 | B2 | 7/2009 | Dinh | |
| 7,860,068 | B2 | 12/2010 | Smith | |

(Continued)

*Primary Examiner* — Lance L Barry
(74) *Attorney, Agent, or Firm* — Convergent Law Group LLP

(57) ABSTRACT

Exemplary embodiments provide methods and systems for dynamically changing a message retrieval scheme during runtime in a client/server electronic messaging system in which the server executes a message retrieval component and incoming messages received from the client is stored in a message queue. Aspects of the exemplary embodiment include accessing messaging business rules from a memory by a message retrieval component at runtime, wherein the messaging business rules define a primary retrieval scheme and a secondary retrieval scheme, and wherein a value provided for each of the primary retrieval scheme and the secondary retrieval scheme are selected from a combination of different message retrieval types including: First In First Out (FIFO), Last In First Out (LIFO), and random. The message retrieval component subdivides the message queue into sub-queues based on at least one of a message quantity limit and a message received time limit specified in the business rules. Each of the sub-queues is then accessed using the value of the secondary retrieval scheme; and messages from each of the sub-queues are retrieved using the value of the primary retrieval scheme.

10 Claims, 5 Drawing Sheets

(56) References Cited

U.S. PATENT DOCUMENTS

| | | |
|---|---|---|
| 2003/0135547 A1 | 7/2003 | Kent |
| 2003/0182464 A1* | 9/2003 | Hamilton et al. ............. 709/314 |
| 2004/0264284 A1* | 12/2004 | Priborsky et al. ............. 365/232 |
| 2006/0109857 A1* | 5/2006 | Herrmann ..................... 370/412 |
| 2006/0277280 A1* | 12/2006 | Craggs ......................... 709/220 |
| 2009/0292790 A1 | 11/2009 | Salonikios |
| 2011/0107350 A1 | 5/2011 | Bittles |

\* cited by examiner

LIFO

Random

Standard Monthly Processing

Processing on 15th and 16th

US 9,049,164 B2

DYNAMIC MESSAGE RETRIEVAL BY SUBDIVIDING A MESSAGE QUEUE INTO SUB-QUEUES

CROSS-REFERENCE TO RELATED APPLICATIONS

This application is a Continuation of Patent Publication number US20130254275 A1, filed Mar. 20, 2012, and published on Sep. 26, 2014, assigned to the assignee of the present application, and incorporated herein by reference.

BACKGROUND

Middleware, such as message-oriented middleware (MOM), for example, includes software or hardware infrastructure such as web servers, application servers, messaging and similar tools that support sending and receiving messages between distributed systems. Middleware can enable interoperability between applications that run on different operating systems by supplying services so the application can exchange data in a standards-based way.

The computer software industry has several well established middleware products that provide message queuing services to customers requiring asynchronous messaging for their enterprise applications. These products have successfully provided asynchronous message retrieval features using a First In First Out (FIFO) queuing scheme. Although the FIFO approach has adequately met the requirements of many applications, it has been unable to address the needs of applications that require a more diverse set of message retrieval options. As a result of this gap in functionality, applications that require a random message retrieval scheme or a Last In First Out (LIFO) scheme, have required developers to write "home grown" custom solutions to satisfy their requirements.

Accordingly, it would be desirable to provide methods and systems for dynamically changing a message retrieval scheme during runtime to enhance the functionality of messaging middleware so that a broader set of customer requirements can be met.

BRIEF SUMMARY

The exemplary embodiments provide methods and systems for dynamically changing a message retrieval scheme during runtime. Aspects of exemplary embodiment include accessing messaging business rules from a memory by a message retrieval component at runtime, wherein the messaging business rules define a primary retrieval scheme and a secondary retrieval scheme, and wherein a value provided for each of the primary retrieval scheme and the secondary retrieval scheme are selected from a combination of different message retrieval types including: First In First Out (FIFO), Last In First Out (LIFO), and random. The message retrieval component subdivides the message queue into sub-queues based on at least one of a message quantity limit or a message received time limit specified in the business rules. Each of the sub-queues is then accessed using the value of the secondary retrieval scheme; and messages from each of the sub-queues are retrieved using the value of the primary retrieval scheme.

DETAILED DESCRIPTION

The exemplary embodiment relates to dynamic message retrieval. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide a messaging system with a dynamic message retrieval component that enables the messaging system to dynamically change its message retrieval scheme during runtime based on a set of messaging business rules. The dynamic message retrieval component 24 provides several message retrieval schemes for use by the messaging system, including FIFO, LIFO, and random message retrieval schemes. This enables each independent application to dynamically customize the messaging system to meet its needs, and to have the message retrieval scheme dynamically adjusts to business conditions as they evolve over time, reducing the need for internal application logic to be customized.

Figure 1:
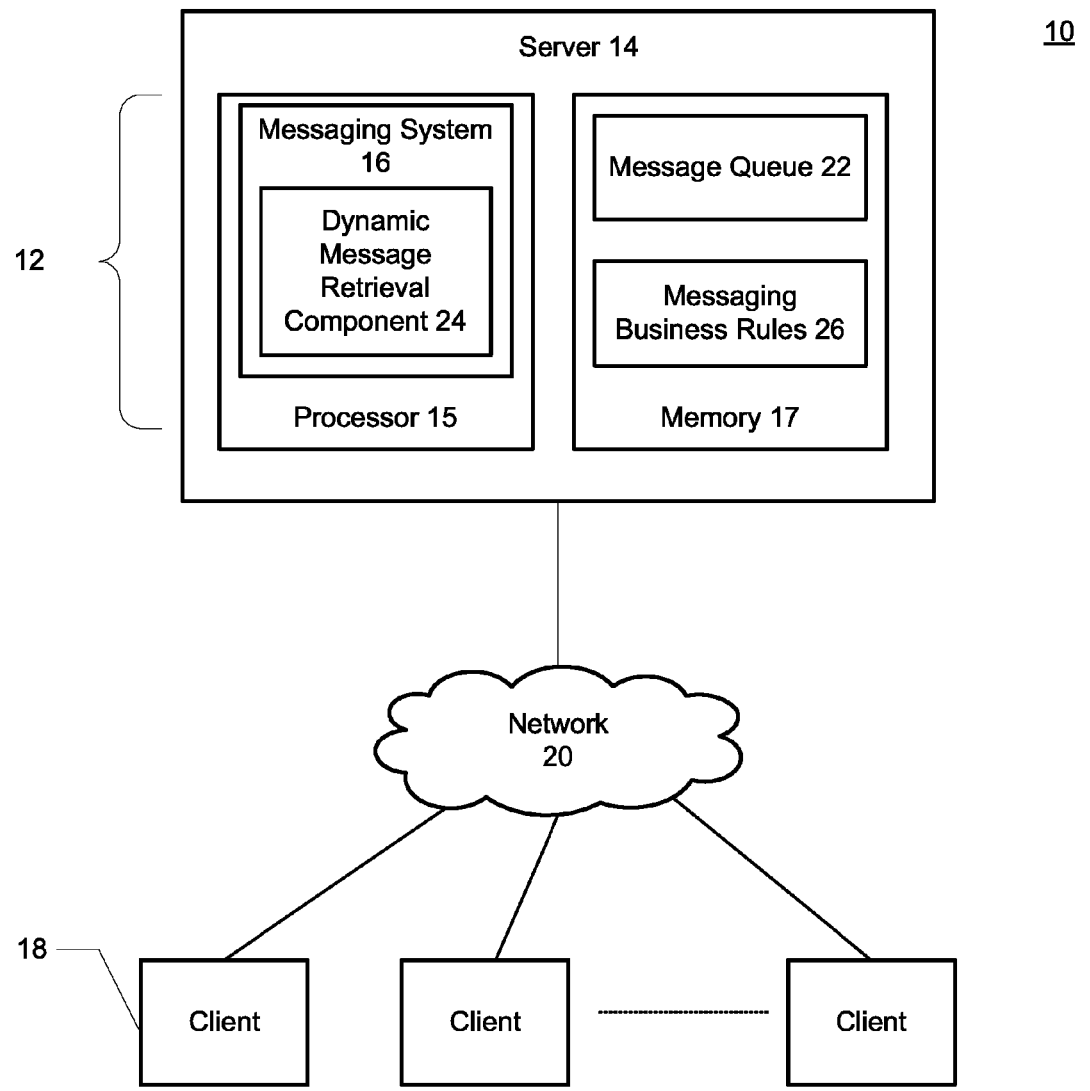
FIG. 1 is a diagram illustrating one embodiment of a dynamic messaging system.

FIG. 1 is a diagram illustrating one embodiment of a dynamic messaging system. The system 10 comprises a client/server architecture shown in which message-oriented-middleware 12 provides communication components that support asynchronous messaging between client/server applications. The clients 18 may exist in various forms, including a personal computer (PC), (e.g., desktop, laptop, or notebook), a smart phone, a set-top box, and the like. Both the server 14 and the clients 18 may include hardware components of typical computing devices, including at least one processor 15, input devices (e.g., keyboard, pointing device, microphone for voice commands, buttons, touch screen, etc.), and output devices (e.g., a display device, and the like). The input/output or I/O devices can be coupled to the system either directly or through intervening I/O controllers (not shown). Network adapters may also be coupled to the system to enable the data processing system to become coupled to other data processing systems or storage devices through intervening private or public networks. Cable modems and Ethernet cards are just a few of the currently available types of network adapters. The server 14 and clients 18 may include computer-readable media, including at least one memory 17 and storage devices (e.g., flash memory, hard drive, optical disk drive, magnetic disk drive, and the like) containing computer instructions that implement the functionality disclosed when executed by the processor 15.

The server 14 hosts a messaging system 16 for access by the clients 18 over a private or public network 20, such as the Internet, to enable messaging for an enterprise, typically between the clients 18. The messaging system 16 may support asynchronous calls between the client and server applications. As the messaging system 16 receives incoming messages from clients 18, the messages are first stored in a message queue 22 and subsequently retrieved according to a message retrieval scheme for forwarding to another process or client 18.

Many conventional messaging systems provide asynchronous message retrieval from the message queue 22 using a First In First Out (FIFO) queuing and processing scheme. In a typical FIFO scheme, messages are placed in a queue and processed in order of receipt. Whenever the system 10 suffers from limited processing capacity and high demand, it is possible that the system 10 will be unable to process all incoming messages in a timely fashion. In such cases, messages at the end of the message queue 22 can be penalized due to their relative position in the message queue 22. In many information systems, the FIFO message retrieval scheme is not sufficient, particularly in cases where the business requirement is to treat a certain quantity of incoming request fairly within a certain time period. In such a case where an enterprise or an application requires a more diverse set of message retrieval options, a developer is traditionally needed to customize the messaging system 16 to provide other retrieval options, such as random message retrieval or Last In First Out (LIFO) message retrieval.

According to the exemplary embodiment, the messaging system 16 is provided with a dynamic message retrieval component 24 that provides the messaging system 16 with the ability to dynamically change its message retrieval scheme during runtime based on messaging business rules 26. The dynamic message retrieval component 24 provides several message retrieval schemes for use by the messaging system 16, including FIFO, LIFO, and random message retrieval schemes. This enables each independent application to dynamically customize the messaging system 16 to meet its needs, and to have the message retrieval scheme dynamically adjusts to business conditions as they evolve over time. Such an approach reduces the need for applications, including the messaging system 16, to be customized.

Accordingly, the basic function of the dynamic message retrieval component 24 is to enable the messaging system 16 to utilize a combination of different message retrieval types and to allow this combined functionality to be dynamically configured during run-time using messaging business rules 26. According to one aspect of the exemplary embodiment, the business rules 26 provide the messaging system 16 with a LIFO and a random message retrieval schemes in addition to the standard FIFO retrieval scheme.

Figure 2:
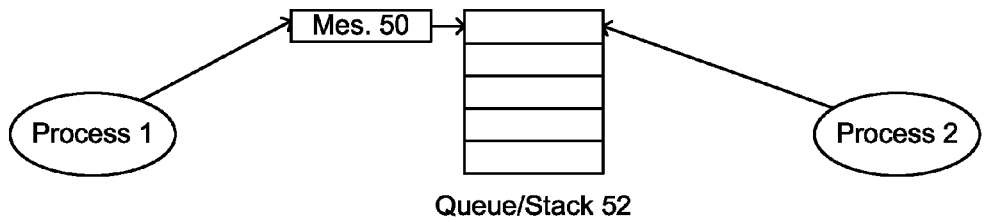
FIG. 2 is block diagram graphically illustrating a LIFO message retrieval scheme.

FIG. 2 is block diagram graphically illustrating the LIFO message retrieval scheme. In the Last In First Out (LIFO or stack) message retrieval, process 1 may place a new message request 50 on top of a queue/stack 52. And process 2 retrieves the new message request 50 from the top of the queue/stack 52 so that the latest message request is processed first. The LIFO retrieval process is opposite from a FIFO process where process 2 would retrieve a message request from the bottom of the queue/stack 52 so that the earliest message request is processed first.

Figure 3:
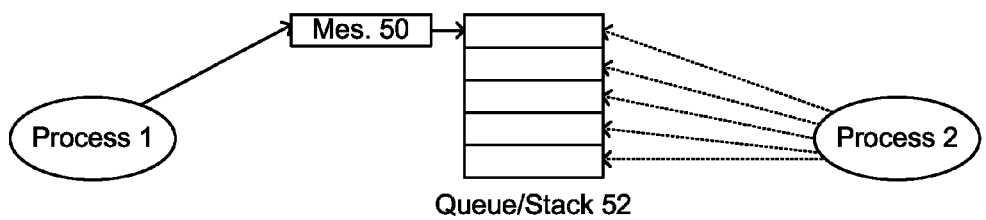
FIG. 3 is block diagram graphically illustrating a random message retrieval scheme.

FIG. 3 is block diagram graphically illustrating the random message retrieval scheme. In random message retrieval, process 1 may place a new message request 50 on top of a queue/stack 52. But process 2 retrieves message requests from a random position in queue/stack 52.

Figure 4:
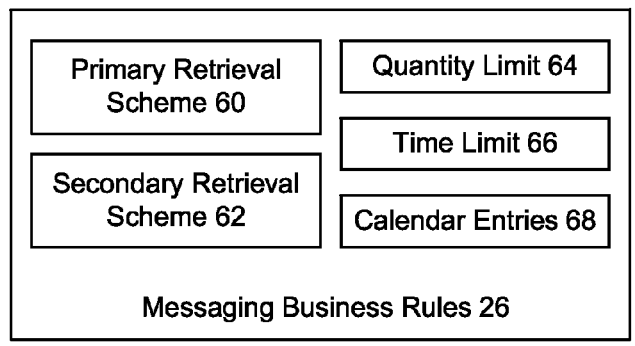
FIG. 4 is a block diagram showing an example schema of the messaging business rules.

FIG. 4 is a block diagram showing an example schema of the messaging business rules 26. According to one embodiment, the messaging business rules 26 may contain values for the following parameters: a primary retrieval scheme 60, a secondary retrieval scheme 62, a quantity limit 64, a time limit 66, and a calendar entry 68.

According to the exemplary embodiment, the dynamic message retrieval component 24 subdivides the message queue 22 into sub-queues based on values entered for the quantity limit 64 or time limit 66 of the messaging business rules 26. The value for secondary retrieval scheme 62 controls the order in which the messaging system 16 accesses the sub-queues. And the values for the primary retrieval scheme 60 controls the order in which the messaging system 16 accesses the messages within each of the sub-queues.

Possible values for the primary retrieval scheme 60 include FIFO, LIFO, and random for the message retrieval scheme. Possible values for the secondary retrieval scheme include FIFO, LIFO, random, and NONE for the message retrieval scheme. When NONE or no value is supplied for the secondary retrieval scheme, the messaging system 16 may use the given primary retrieval scheme as a default to access the messages in the message queue 22.

The value of the quantity limit 64 is used along with the primary and secondary retrieval schemes 60 and 62 to set different retrieval schemes based the number of messages received. In one embodiment, this business rule parameter is not applicable when the secondary retrieval scheme is NONE.

The value of the time limit 66 may be used as an alternative to the quantity limit 66 parameter described above. The time limit 66 is used along with the primary and secondary retrieval schemes to set different retrieval schemes based the number of messages received in a given amount of time. In one embodiment, this business rule parameter is not applicable when the secondary retrieval scheme is NONE.

A value of the calendar entry 60 may be used to set different retrieval schemes based on calendar dates for multiple time periods. When this option is used, the messaging system 16 may be given multiple values for each of the business rules listed above based on the calendar. When the calendar entry is "UNSET" with no corresponding entries, all other settings may remain valid regardless of the current date-time.

Accordingly, the system 10 enables the messaging system 16 to perform a variety of message retrieval schemes dynamically in response to the messaging business rules 26, which can be updated anytime. By defining parameters such as quantity and time limit 64 and 66 and calendar entries 68, the messaging business rules 26 allow the message retrieval scheme of the messaging system 16 to adjust to business conditions without requiring manual intervention. Several embodiments of this approach are described further below.

Although the server 14 is shown as a single computer, it should be understood that the functions of server 14 may be distributed over more than one server, and the functionality of the messaging system 16 and the dynamic message retrieval component 24 may be combined into a lesser or a greater number of modules/components. For example, the dynamic message retrieval component 24 may be implemented as more than one component and/or may be implemented as part of the messaging system 16 or as a component that is separate from the messaging system 16. In an alternative embodiment (not shown), the messaging system 16 and the dynamic message retrieval component 24 of FIG. 1 may be implemented as a virtual entity whose functions are distributed over multiple clients 18.

Figure 5:
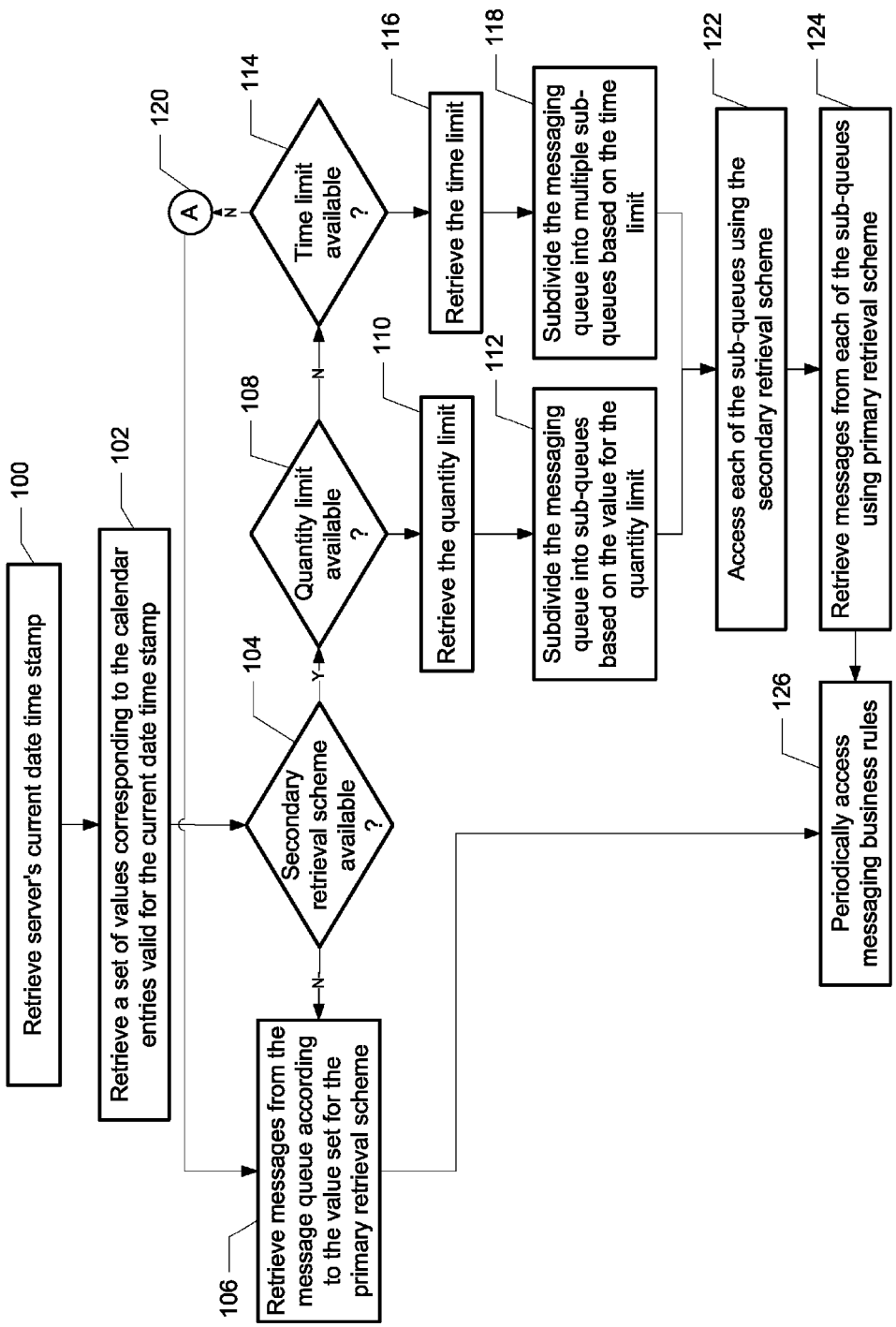
FIG. 5 is a flow diagram illustrating an embodiment of a process for performing dynamic message retrieval based on the messaging business rules.

FIG. 5 is a flow diagram illustrating an embodiment of a process for performing dynamic message retrieval based on the messaging business rules 26. According to the exemplary embodiment, the process may be performed at least in part by dynamic message retrieval component 24 executing on the processor 15 of the server 14. Upon startup of the dynamic message retrieval component 24, the current date timestamp of the server 14 is retrieved (block 100).

The dynamic message retrieval component 24 retrieves a set of values (if any) corresponding to the calendar entry 68 that are valid for the current date timestamp (block 102). The dynamic message retrieval component 24 determines whether values for secondary retrieval scheme are available (block 104). If values for secondary retrieval scheme are not available, then the messaging system 16 is instructed to retrieve messages from the message queue 22 according to the value set for the primary retrieval scheme 60 (block 106).

If it is determined that values for secondary retrieval scheme are available (block 104), then the dynamic message retrieval component 24 determines whether a value is available for the quantity limit 64 (block 108). If a value for the quantity limit 64 is available, then the dynamic message retrieval component 24 retrieves the value for the quantity limit 64 (block 110). The dynamic message retrieval component 24 also subdivides the message queue 22 into multiple sub-queues based on the value for quantity limit 64 (block 112).

If it is determined that no value for the quantity limit 64 is available (block 108), then the dynamic message retrieval component 24 determines whether a value is available for the time limit 66 (block 114). If a value is available for the time limit 66, then the dynamic message retrieval component 24 retrieves the value for the time limit (block 116). The dynamic message retrieval component 24 also subdivides the message queue 22 into multiple sub-queues based on the value for the time limit 66 (block 112).

If it is determined that no value for the time limit 66 is available (block 114), then no value was set in messaging business rules 26 for either the quantity limit 64 or the time limit 66. This may be treated as an error condition that is resolved as if no secondary retrieval scheme 62 was specified, and the process continues at block 106.

If a value exists for either the quantity limit 64 the time limit 66, then the process continues with the dynamic message retrieval component 24 instructing the messaging system 16 to access each of the sub-queues using the value set for the secondary retrieval scheme 62 (block 122). The dynamic message retrieval component 24 also instructs the messaging system to retrieve messages from each of the sub-queues using value set for the primary retrieval scheme 60 (block 124).

The dynamic message retrieval component 24 may periodically access the messaging business rules 26 to check for updated values (block 126). The actual time intervals between access of the business rules 26 is dependent upon application, but example time intervals include hourly or daily access. In one embodiment, the time interval may be configurable by an administrator or user.

Below are several example scenarios of the messaging business rules 26 which are provided to illustrate the exemplary embodiments.

Example 1

In Example 1, the two sets of business rules values are defined as follows:
  Calendar Entry: UNSET
  Primary Retrieval Scheme: FIFO
  Secondary Retrieval Scheme: NONE
  Quantity Limit: N/A
  Calendar Entry: Starting on the 15th of the month and ending on the 16th of the month
  Primary Retrieval Scheme: Random Retrieval
  Secondary Retrieval Scheme: LIFO
  Quantity Limit: 10
  Time Limit: NONE In this example, the different sets of messaging business rules causes the messaging system 16 to automatically employ a different message retrieval scheme based on the calendar settings. The first set of messaging business rules defines a standard queuing scheme (FIFO) that will be used by the messaging system 16 for all time periods. The second set of messaging business rules defines an exception to the standard queuing scheme (RANDOM) that will be used by the messaging system 16 only on the 15th and $16^{th}$ of the month, as specified by the "Calendar Entry" value.

Figure 6:
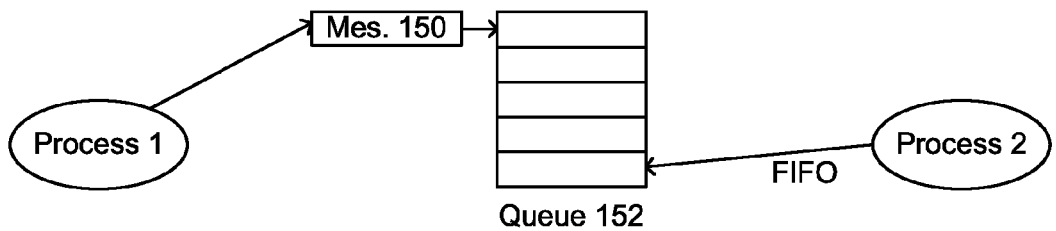
FIG. 6 is a diagram graphically illustrating message processing based on the messaging business rules of Example 1.
Figure 6:
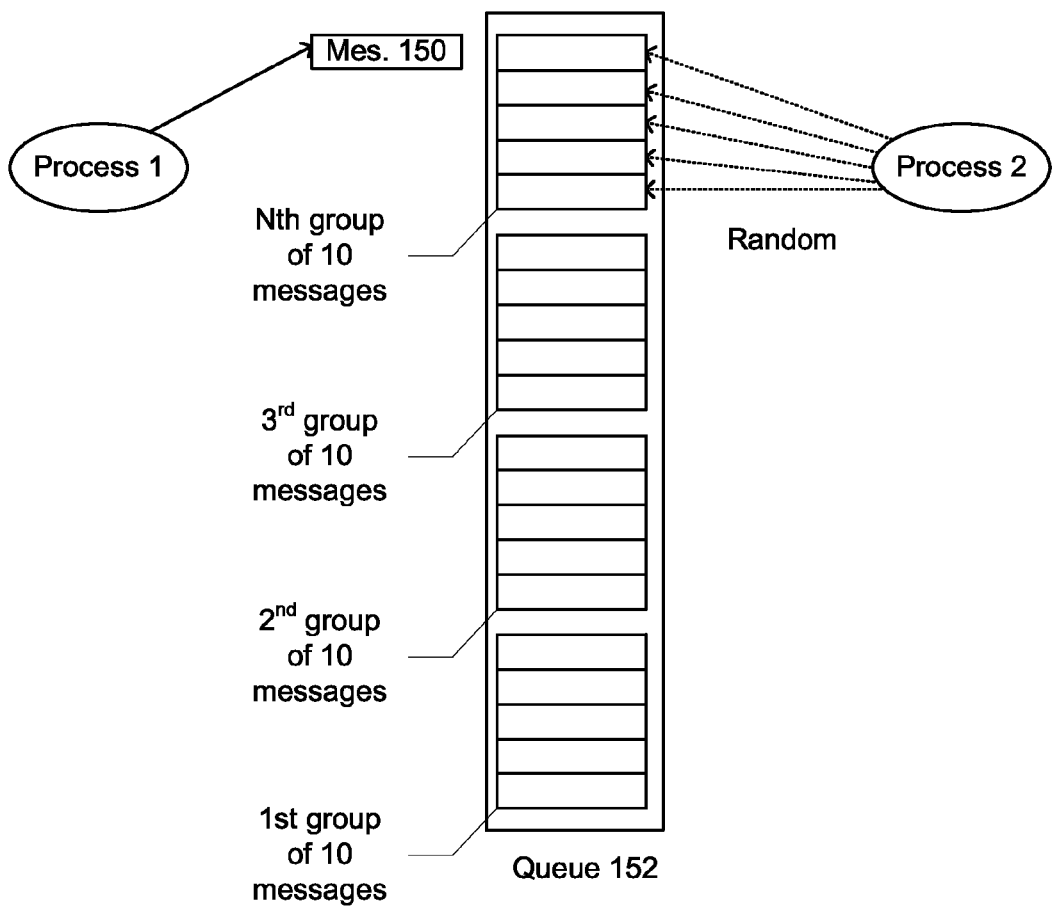

FIG. 6 is a diagram graphically illustrating message processing based on the messaging business rules of Example 1. During standard monthly processing, the primary retrieval scheme is set to FIFO without a secondary retrieval scheme. Therefore, messages 150 are retrieved from the message queue 152 using FIFO.

When the dynamic message retrieval component 24 determines the system date matches the dates of the calendar entry in the second set of business rules, then processing is performed as specified in the second set of business rules. First, the message queue 152 is subdivided into sub-queues of 10 messages each, as specified by the quantity limit, creating $1^{st}$, $2^{nd}$, $3^{rd}$ ... nth sub-queues. Next, the sub-queues are accessed according to the order specified in the secondary retrieval scheme, which is set to LIFO. As such, the latest or Nth sub-queue is accessed first. And the messages therein are accessed via the primary retrieval scheme, which is set to random.

Example 2

In Example 2, one set of business rules values are defined as follows:
  Calendar Entry: UNSET
  Primary Retrieval Scheme: LIFO
  Secondary Retrieval Scheme: FIFO
  Quantity Limit: NONE
  Time Limit: 10 minutes
In this example, there is no calendar entry so a combination of FIFO for the sub-queues and LIFO for the messages will be used for all time periods.

Figure 7:
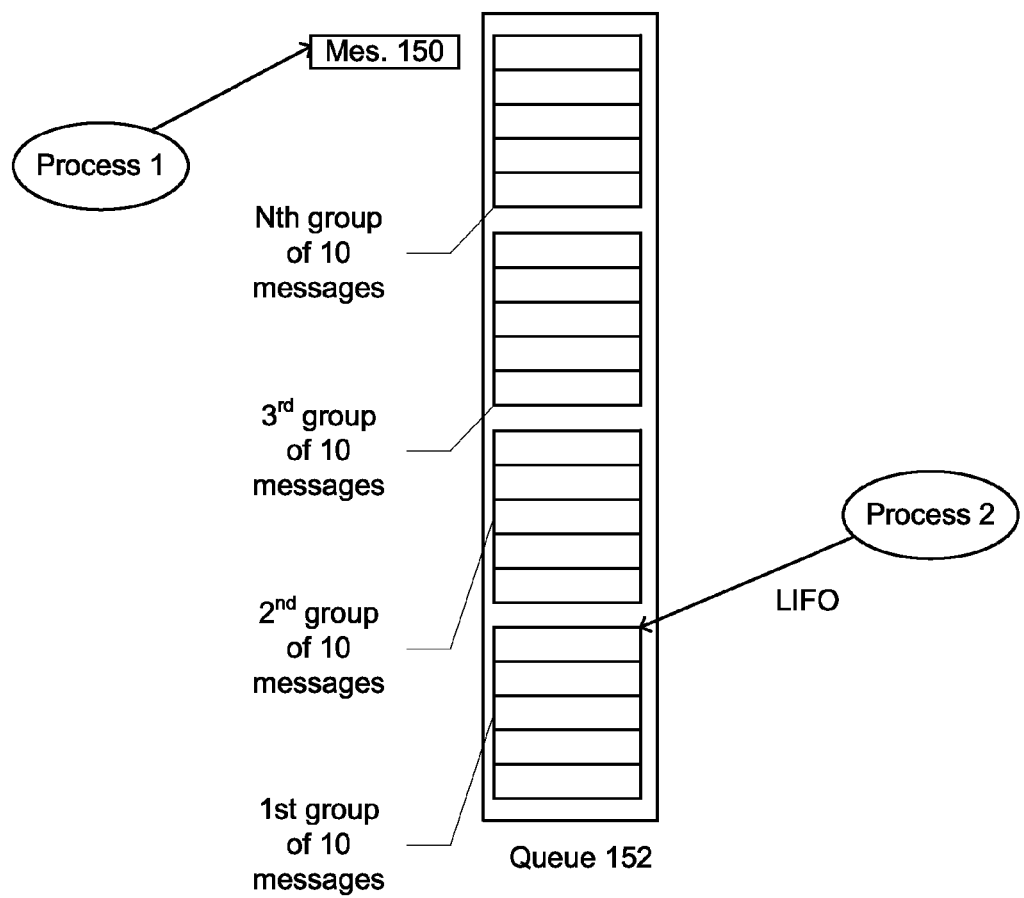
FIG. 7 is a diagram graphically illustrating message processing based on the messaging business rules of Example 2.

FIG. 7 is a diagram graphically illustrating message processing based on the messaging business rules of Example 2. The message queue 152 is subdivided into sub-queues of 10 messages each, as specified by the quantity limit, creating $1^{st}$, $2^{nd}$, $3^{rd}$ ... nth sub-queues. Next, the sub-queues are accessed according to the order specified in the secondary retrieval scheme, which is set to FIFO, meaning the 1st sub-queue is accessed first. The messages are then accessed via the primary retrieval scheme, which is set to LIFO.

Although there are no time period settings, additional settings could be applied for a new time period by creation of a calendar entry in the messaging business rules 26. Modification to the messaging business rules 26 by an administrator can be done without any application downtime.

The exemplary embodiments will be further explained by way of use cases.

Use Case 1:

A company that manages the distribution of tickets for a major NFL franchise has decided to run a promotion that will reward free regular season tickets to 100 customers who purchase tickets to the team's preseason games. In order to give each customer an equal chance at winning the tickets, the company has decided not to award the free tickets to the first 100 customers, but would rather select the winners randomly based on the week in which the purchase was made. The desired affect is to give everyone who purchases a ticket in Week 1 an advantage over Week 2 customers, but everyone who purchases a ticket in Week 1 shall have an equal chance at winning the tickets. This problem can be solved by configuring the messaging system to retrieve messages from the queue randomly for the group of purchases made in Week 1, and continue with the same scheme in Week 2 after Week 1 processing is complete.

The business rules for this scenario would be set as follows:
Calendar Entry: UNSET
Primary Retrieval Scheme: Random Retrieval
Secondary Retrieval Scheme: FIFO
Quantity Limit: NONE
Time Limit: 1 Week Use Case 2:

A human resources application continuously processes messages retrieved from a queue throughout the month. For the majority of the month, several different types of requests are sent to the queue, including travel reimbursements, new-hire relocation expense reports, etc. Recently, it has been determined that all payroll requests will be submitted on the 15th of the month and these requests must be given a higher priority over all other requests in the queue. The application team must accommodate this change without making any changes to the application. A business rule can be used to change the retrieval options for the messaging system so that a LIFO scheme will be used on the 15th of the month, and FIFO at all other times.

The business rules for this scenario would be set as follows:
Calendar Entry: Starting on the $15^{th}$ of the month, and ending on the $16^{th}$
Primary Retrieval Scheme: LIFO
Secondary Retrieval Scheme: NONE
Quantity Limit: NONE
Time Limit: NONE
Calendar Entry: UNSET
Primary Retrieval Scheme: FIFO
Secondary Retrieval Scheme: NONE
Quantity Limit: NONE
Time Limit: NONE Use Case 3:

A service provider processes messages from a queue in a traditional fashion, but each month there is a spike in demand that causes shortages from the 25th of the month to the end of the month. During this period, the service provider has decided not to reward clients based on their position in the queue. There is a business requirement to have messages retrieved randomly from the queue during the peak period at the end of the month. This scenario can be solved with the use of a messaging system that is configured to retrieve messages in a FIFO fashion from the beginning of the month until the 25th of the month, and then use a random retrieval scheme from the 25th to the end of the month.

The business rules for this scenario would be set as follows:
Calendar Entry: Starting on the 25th of the month, and ending on the last day of the month
Primary Retrieval Scheme: Random Retrieval
Secondary Retrieval Scheme: NONE
Quantity Limit: NONE
Time Limit: NONE
Calendar Entry: UNSET
Primary Retrieval Scheme: FIFO
Secondary Retrieval Scheme: NONE
Quantity Limit: NONE
Time Limit: NONE A method and system for dynamically changing a message retrieval scheme during runtime has been disclosed. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for dynamically changing a message retrieval scheme during runtime in a client/server electronic messaging system in which the server executes a message retrieval component and incoming messages received from the client is stored in a message queue, the method comprising:

accessing messaging business rules from a memory by the message retrieval component at runtime, wherein the messaging business rules define a primary retrieval scheme and a secondary retrieval scheme, and wherein a value provided for each of the primary retrieval scheme and the secondary retrieval scheme are selected from a combination of different message retrieval types including: First In First Out (FIFO), Last In First Out (LIFO), and random;

subdividing the message queue into sub-queues based on at least one of a message quantity limit and a message received time limit specified in the messaging business rules;

accessing each of the sub-queues using the value of the secondary retrieval scheme; and retrieving messages from each of the sub-queues using the value of the primary retrieval scheme.

2. The method of claim 1 wherein accessing messaging business rules further comprises accessing a calendar entry value and at least one of a quantity limit value and a time limit value.

3. The method of claim 2 wherein the message retrieval component uses the calendar entry value to set different retrieval schemes based on calendar dates for multiple time periods.

4. The method of claim 2 wherein the message retrieval component uses the quantity limit value along with the primary and secondary retrieval schemes to set different retrieval schemes based a number of messages received.

5. The method of claim 2 wherein the message retrieval component uses the time limit along with the primary and secondary retrieval schemes to set different retrieval schemes based a number of messages received in a given amount of time.

6. The method of claim 1 wherein possible values for the secondary retrieval scheme include the FIFO, the LIFO, and the random message retrieval types, and NONE.

7. The method of claim 1 further comprising: accessing by the message retrieval component, a current date timestamp of the server upon startup.

8. The method of claim 7 further comprising: retrieving by the message retrieval component, a calendar entry from the messaging business rules that is valid for the current date timestamp.

9. The method of claim 7 further comprising: in response to determining that a value for the secondary retrieval scheme is not available, instructing the messaging system to retrieve messages from the message queue according to the value set for the primary retrieval scheme.

10. The method of claim 1 further comprising: periodically accessing the messaging business rules to check for updated values.

* * * * *